United States Patent [19]

Vernet et al.

[11] Patent Number: 4,586,172

[45] Date of Patent: Apr. 29, 1986

[54] ADAPTABLE FILTERING DEVICE AND METHOD FOR FILTERING SONAR SIGNALS TO REMOVE REVERBERATION SIGNALS DUE TO VEHICLE SPEED AND TRIM AND THE SEA SURFACE AND SEA BOTTOM

[75] Inventors: Jean L. Vernet; Philippe Bayle; Georges G. Bienvenu; Gérard Vernay, all of Paris, France

[73] Assignee: Thomson-CSF, Paris, France

[21] Appl. No.: 487,280

[22] Filed: Apr. 21, 1983

[30] Foreign Application Priority Data

Apr. 23, 1982 [FR] France ................................ 82 07066

[51] Int. Cl.[4] .......................... G01S 7/66; G01S 15/02
[52] U.S. Cl. ...................................... 367/97; 367/904
[58] Field of Search ....................... 367/90, 97, 904, 98

[56] References Cited

U.S. PATENT DOCUMENTS

| | | | |
|---|---|---|---|
| 3,370,266 | 2/1968 | Taddeo et al. | 367/904 X |
| 3,723,954 | 3/1973 | Nelkin et al. | 367/97 |
| 4,169,256 | 9/1979 | Bergman et al. | 367/904 X |
| 4,316,269 | 2/1982 | Vant Hullenaar | 367/904 X |

*Primary Examiner*—Richard A. Farley
*Attorney, Agent, or Firm*—Cushman Darby & Cushman

[57] ABSTRACT

An adaptable filtering device and method for filtering sonar signals to remove reverberation signals caused by the vehicle speed and trim and the sea surface and sea bottom. The vehicle itself has an antenna for transmitting and receiving sonar signals, a speed detector, a trim detector, a depth detector, and a distance-to-sea bottom detector and a sonar output device. The present invention forms paths corresponding to each distinct direction from which sonar signals are received by the antenna, each path having a path signal $B_i$. For each path, a calculation is made to determine a central Doppler-shift frequency $\Delta f_i$ and a cut-off frequency $f_{ci}$ which are to be used to filter the path signal. This calculation is based upon the detected vehicle speed, the detected vehicle trim, the detected vehicle depth, and the detected distance between the vehicle and the sea bottom. The calculated frequencies $\Delta f_i$ and $f_{ci}$ are then supplied to a controllable filter which filters the path signal and provides a filtered output signal to the sonar output device.

13 Claims, 9 Drawing Figures

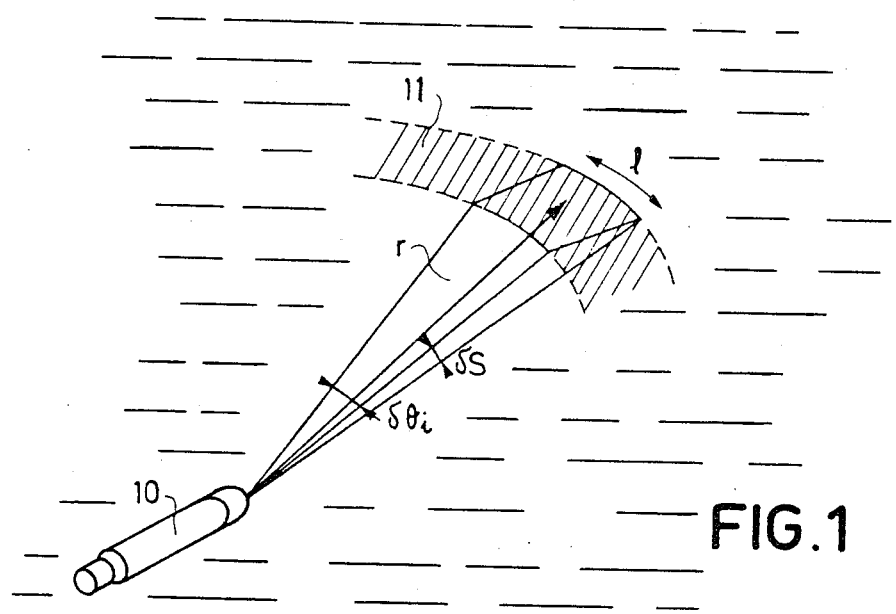
FIG.1
FIG.2
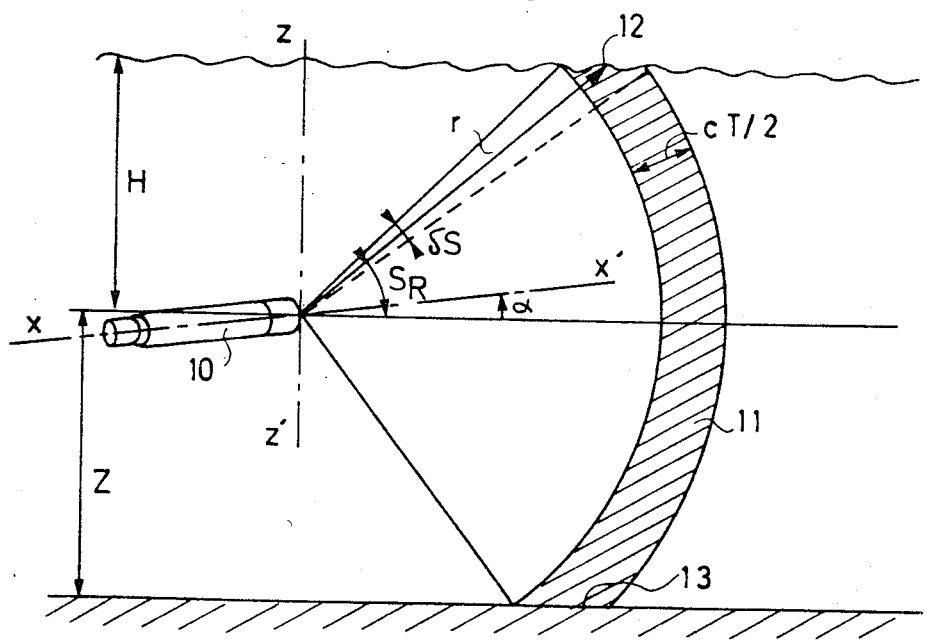

ADAPTABLE FILTERING DEVICE AND METHOD FOR FILTERING SONAR SIGNALS TO REMOVE REVERBERATION SIGNALS DUE TO VEHICLE SPEED AND TRIM AND THE SEA SURFACE AND SEA BOTTOM

BACKGROUND OF THE INVENTION

The present invention concerns an adaptable filtering device and method for signals received by an active sonar, mounted on a mobile carrier, for rejecting reverberation signals.

It is known that a sonar-type apparatus on a carrier vehicle in motion (boat, submarine, torpedo, etc.) detects and localizes other vehicles or objects by emitting ultrasonic waves throughout the surrounding under water space(hereinafter called insonified space) and by observing the echoes received as to their distance and their direction. It is also well known that the ultrasonic energy thus transmitted in the underwater medium is reverberated by particles, bubbles and other discontinuities present in the medium or on its surface.

This reverberation interferes with the reception of the echoes since it tends to mask them. One means used to diminish the reverberation is to form at the reception, very directive angular paths, but this means is limited by the dimensions of the antenna.

The carrier vehicle being in motion, the frequency of the emitted signal sent back by an immobile target is shifted by the Doppler effect, peculiar to the carrier; this is the case for the reverberation, in which heterogeneities of the medium behave like fixed targets. When the target is in motion, which is the most frequent case, the frequency of the signal sent back by the target is shifted both by the Doppler effect due to movement the carrier and the target. It follows from this that the frequency of the signal corresponding to the reverberation and that corresponding to the target are different. It is known to use this difference of received frequencies for separating the signals from the echoes of the reverberation.

Thus, in the sonar-type electro-acoustic apparatuses, a band rejection filter is used in order to attenuate the reverberation. This filter generally has a fixed band width and a central frequency that varies as a function of the frequency shift caused by the Doppler effect due to carrier movement, i.e. as a function of the speed of this carrier. A filtering device of this type, applied to a torpedo sonar, is described in U.S. Pat. No. 3,723,954.

In this device the bandwidth of the rejection filter is calculated as a function of an average speed. Then, this band width varies with speed, the observation direction, i.e. the direction of the path and, as will be seen, with the width of the directivity lobe of this path.

SUMMARY OF THE INVENTION

The filtering device and method according to the present invention has the advantage, with respect to the prior art, of optimizing the reverberation rejection filter as a function of the speed of the carrier, the directive properties of the sonar, and the direction of the target.

For a torpedo sonar, the average level of the secondary lobes remains high and the elevation inclination varies at any moment. This means that the level of reverberation received is due mainly to the border-line reverberations: sea bottom and, above all, surface.

According to the invention a filtering device for each signal path calculates, at different instants of signal reception, the extreme frequencies $f_{max}$ and $f_{min}$ in order to better eliminate the reverberation signal due to the surface and/or the sea-bed. To accomplish this, angles of bearing and elevation are caused to intervene in the calculation $f_{max}$ and $f_{min}$.

Two embodiments are described, with a certain number of variants:
a temporal analogical or digital filtering of each signal path;
a filtering by elimination of spectral-lines, after special analysis of each path signal.

This latter embodiment is advantageous in the case where the processing of the signal paths consists in determining an acoustic direction for the search or follow-up of a target, without needing to display the signals: this is the case in torpedoing.

A useful simplified variant is also described wherein the elevation angle of the carrier does not vary, i.e. when the filtering device is applied to a sonar of a hull or a sub-marine.

According to the invention, a filtering device adapted for signals received by an active sonar mounted on a carrier vehicle travelling at a speed V measured by a speed collector, includes signal path formation circuits $B_i$ corresponding to distinct directions, control means for filtering each signal path, and calculating means to receive a speed signal V and control the filtering means in order to eliminate in the signal path signals the Doppler frequencies due to the speed of the carrier. The calculating means also receive signals $S_i$ emitted by the path formation circuits in order to designate the filtered path, and the said calculating means determines the Doppler frequencies to be eliminated by taking into consideration furthermore the orientation and the width of the filtered path.

Other particularities and advantages of the invention will become evident in the following description given by a way of non-limitative example and elaborated with respect to the annexed figures which represent:

BRIEF DESCRIPTION OF THE DRAWINGS

FIGS. 1 and 2 the underwater space insonified by a torpedo;

DESCRIPTION OF THE PREFERRED EMBODIMENTS

Figure 3:
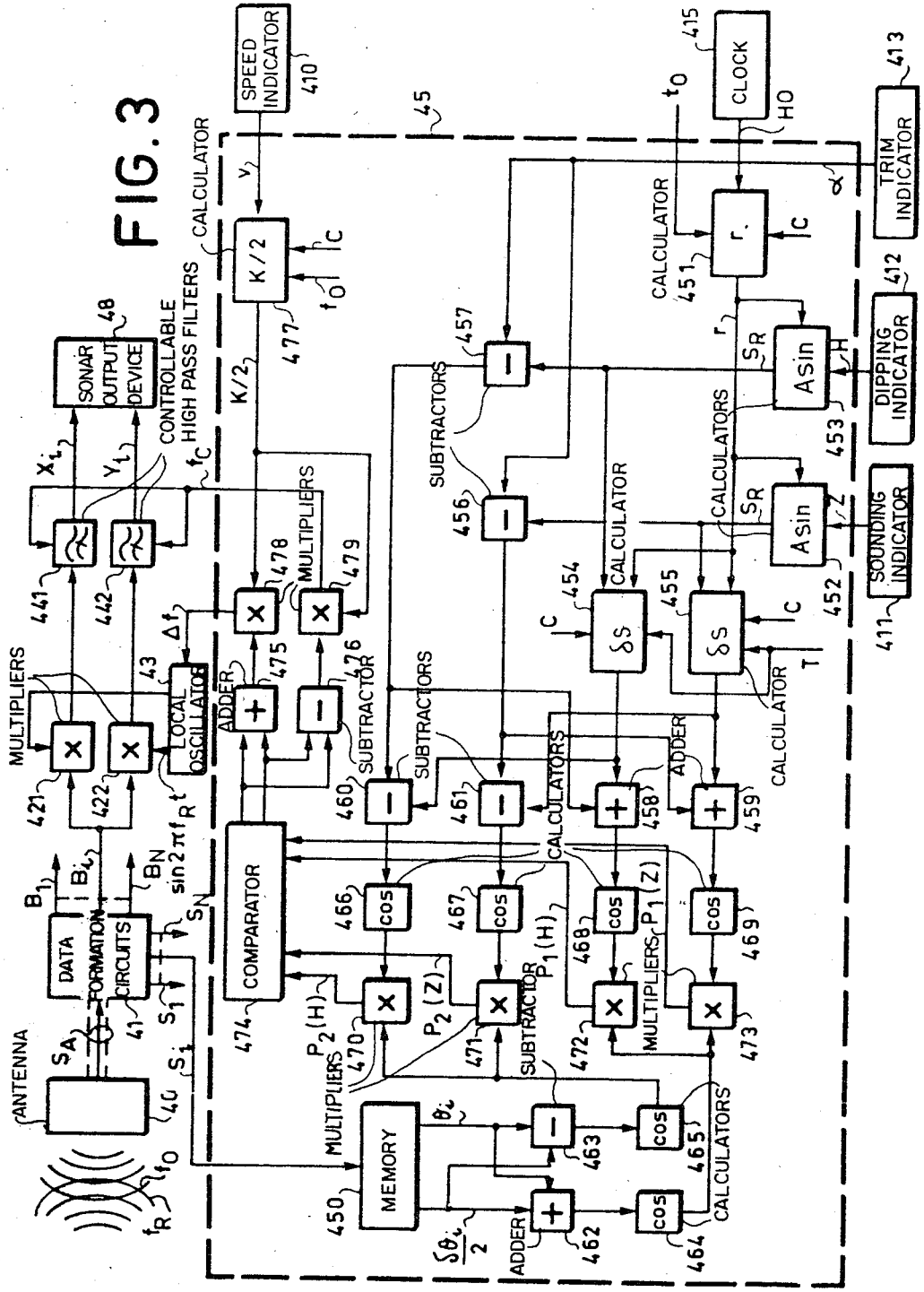
FIG. 3 the diagram of a sonar and its filter device according to the invention.

FIGS. 1 and 2 represent a torpedo 10 maneuvering underwater and the insonified volume 11 corresponding to an instant t of reception for an emitted pulse of duration T. At this instant t of reception, volume 11 corresponds to a distance r equal to $c(t-t_0)/2$, $t_0$ being the emission instant and c the speed of sound. The insonification of the surface and the seabed occurs in two areas 12 and 13 which have the shape of crowns around the vertical axis zz' and have a width proportional to cT/2. These areas define the reverberating zones.

In taking, as example, the case of the surface reverberation, zone 12 has an average elevation angle $S_R$ that is equal to arc sin H/r (equation (1) in which H is the depth of the torpedo. The angular width in elevation across the surface reverberation zone 12 is $\delta S$.

The spectrum of the parasitic signal received in a given sonar path at instant t depends on:
the distance r;
the duration of pulse T and its spectrum;
the emission and reception directivities of the path in azimuth between 0 and $2\pi$;
the emission and reception directivities of the path in elevation for S between $S_R + \delta S/2$ and $S_R - \delta S/2$.
inclination $\alpha$ of the carrier with the horizontal;
the reverberation index of each elementary part of the reverberation zone (the index depends, for the surface, on the state of the sea).

The knowledge of this spectrum at each instant allows a calculation of, for a given path signal, the maximum and minimum frequencies between which the level exceeds the given value. These frequencies constitute cut-off frequencies $f_{min}$ and $f_{max}$ of the rejection filter, allowing it to better eliminate, at this instant and for this path, the disturbing signal due to the surface reverberation.

According to the same principle, by considering the reverberation intercepted on the sea-bed and by replacing the depth H by the distance to the bed Z, the extreme frequencies of the rejection filter can be determined, allowing better elimination of the disturbing signal due to the reverberation of the sea bed.

In a first embodiment, these limits $f_{min}$ and $f_{max}$ are calculated in an approximate way.

In the first approximation, it is considered that the width of the reverberating zone in bearing 1 is limited to the angular width of the principal lobe $\delta\theta_i$ of the product of the emission-reception directivities in azimuth, width taken, for example, at 3dB attenuation of the maximum. Always in the first approximation only the directions in elevation comprised in the principal lobe of the product of the emission-reception directivities in elevation, width taken also, for example, at 3dB attenuation of the maximum, are considered. For the other directions, it is considered that the reverberation level received is slightly high and that elimination has not been performed.

In referring to FIGS. 1 and 2, at a given instant the reverberation level received comes from surface diffusion (for this example) the directions of which are comprised in an angular section delimited by $\delta\theta_i$ and $\delta S$. The direction corresponding to r is defined by bearing $\theta_i$ of the path considered with respect to axis xx' of the torpedo and by elevation $S_R - a$ in which $\alpha$ is the inclination of axis xx' with respect to the horizontal. Since, with this approximation, it is considered that the reverberated signal is produced by diffusers, the directions of which are comprised in bearing between $\theta_i - \alpha\theta i/2$ and $\theta_i \delta 0i/2$, and in elevation $S_R - \alpha - \delta S/2$ and $S_R - \alpha + \delta S/2$, the expressions $f_{max}$ and $f_{min}$ can be determined without having to intervene in the reverberation spectrum of the signal.

If v is the speed of the carrier, $f_0$ the emission frequency and c the speed of sound in water, the shift of frequency $\Delta f$, due to the Doppler effect, is given, in the direction of the movement of this carrier, by:

$$\Delta f = 2v/cf_0 = K \tag{2}$$

In any direction defined by angles $\theta$ and S, this shift will be given by:

$$\Delta f = K \cos S\omega\theta \tag{3}$$

Consequently, the expressions giving $f_{m/n}$ and $f_{max}$ will be:

$$f_{min} = f_0 + K \cos\left(\theta_i + \frac{\delta\theta_i}{2}\right) \cos\left(S_R - \alpha + \frac{\delta S}{2}\right) \tag{4}$$

$$f_{max} = f_0 + K \cos\left(\theta_i - \frac{\delta\theta_i}{2}\right) \cos\left(S_R - \alpha - \frac{\delta S}{2}\right)$$

in which $S_R$ is given by (i) and $\delta S$ by:

$$\delta S = tg\, S_R \times cT/2r \tag{5}$$

An embodiment using these expressions (4) is represented in FIG. 3.

An antenna 40 emits pulses at frequency $f_0$ and receives pulses at frequency $f_R$ shifted from $f_0$ by the Doppler effect with $f_R = f_0 + \Delta f$. In a manner known per se, signals $S_A$ supplied by the reception antenna are applied to path formation circuits 41 in which these signals are delayed and added up in order to form angular paths in several directions.

Each path signal, such as B, is demodulated in a synchronous way around a frequency $f_R = f_0 + \Delta f$ by multiplication by two signals in quadrature cos $(2\pi f_R t)$ and sin $(2\pi f_R t)$. Frequency $f_R$ is supplied to two multipliers 421 and 422 by a local oscillator 43, which is, for example, a voltage control oscillator (VCO in Anglo-American literature). This oscillator 43 receives value $\Delta f$ to control the frequency variation. The two components of the demodulated signal are filtered in two identical high-pass filters 441 and 442, the cut-off frequency $f_c$ of which is, according to the invention, a function of the direction and the width of the path.

In taking as parameters:

$$P_1 = \cos\left(\theta_i + \frac{\delta\theta_i}{2}\right) \cos\left(S_R - \alpha + \frac{\delta S}{2}\right) \tag{6}$$

$$P_2 = \cos\left(\theta_i - \frac{\delta\theta_i}{2}\right) \cos\left(S_R - \alpha - \frac{\delta S}{2}\right)$$

the following relationships are obtained from equations (4):

$$\Delta f = \frac{K}{2}(P_1 + P_2) \tag{7}$$

$$f_c = \frac{K}{2}(P_1 - P_2)$$

The values of $\Delta f$ and $f_c$ are supplied by an assembly of calculation circuits 45 that receive:
vehicle speed v, distance to the sea-bed Z, depth H and trim $\alpha$ supplied by suitable measurement devices or pick-ups 410, 411, 412, 413 installed on the torpedo;

a signal HO delivered by a clock 415, in order to obtain the measurement of time t that follows from emission instant $t_o$ of each sonar pulse;

the values of the other parameters necessary for the calculation of $\Delta f$ and $f_c$: the duration of pulse T, the emission frequency $f_0$ and the speed of sound in water c.

Each path signal Bi is indicated by a digital signal $S_i$ that supplies the values of $\theta_i$ and $\delta\theta/2$ contained in memory 450.

Circuit 451 calculates from signals HO, $t_0$ and c, the value of r according to formula $r = c(t - t_0)/2$.

Two identical circuits 452 and 453 calculate, from this value or r and signals Z and H two values of angle $S_R$, corresponding respectively to the reflection on the sea-bed and the surface, according to equation (1). Indeed, it is only possible to choose between the reflection on the surface and that on the sea-bed after having made the two calculations.

Two identical circuits 454 and 455 calculate, for the values of $S_R$, and from the values of r, T and c, the two corresponding values of $\delta S$, according to formula (5).

Two subtractors 456 and 457 deduct from the two values of $S_R$ the value of angle $\alpha$.

Two adders 458 and 459 add for the two values of $S_R$, the two corresponding values of $\delta S$ to the values of $S_R - \alpha$ obtained at the output of subtractors 456 and 457.

Furthermore, two subtractors 460 and 461 substract values $\delta S$ from values of $S_R - \alpha$.

The value of $\delta\theta_i/2$ read in memory 450 is respectively added from an adder 462, and substracted in a subtractor 463, to the value of $\theta_i$ read from this same memory.

Six circuits 464 to 469 calculate the cosines of angles obtained at the outputs of circuits 459 to 463.

The cosines of the elevation angles are multiplied with cosines of the bearing angles in four multipliers 470 to 473, to obtain the values of parameters $P_1$ and $P_2$ corresponding to depth H and to the distance to sea-bed Z, by applying expression (6).

These values are compared with one another in a comparator circuit 474 so as to choose the values of $P_1$ and $P_2$ that gives the best rejection:

if $P_1(Z) > P_1(H)$ and $P_2(Z) < P_2(H)$, the circuit supplies $P_1(H)$ and $P_2(H)$, and reciprocally;

if $P_1(Z) < P_1(H)$ and $P_2(Z) < P_2(H)$, the circuit supplies $P_1(Z)$ and $P_2(H)$.

An adder 475 and a subtractor 476 obtain, from these selected values of $P_1$ and $P_2$, $(P_1 + P_2)$ and $(P_1 - P_2)$.

The value of parameter $K/2$ is obtained, by applying formula (2), from a circuit 477 that receives the values of V, $f_0$ and c.

Two multipliers 478 and 478 thus calculate from $K/2$, from $(P_1 + P_2)$ and from $P_1 - P_2)$, $\Delta f$ and $f_c$ by applying formula (7).

Figure 4:
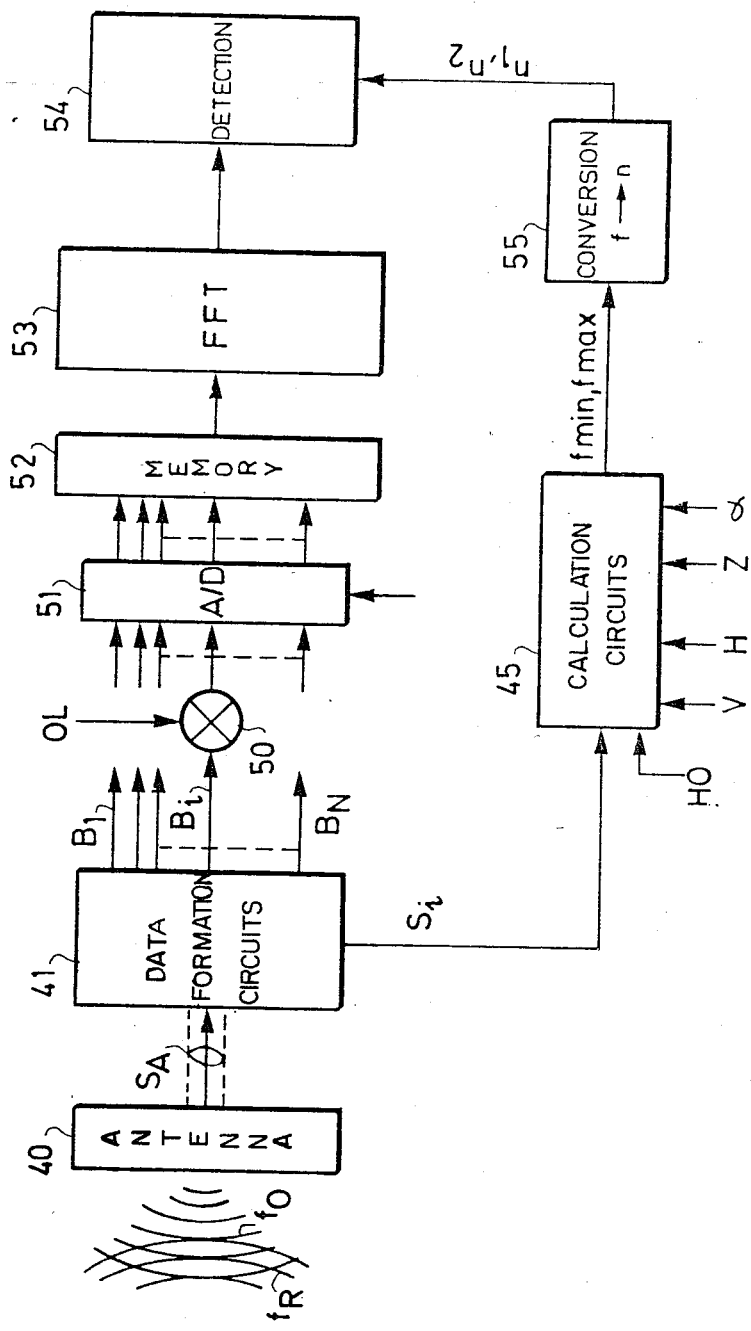
FIG. 4 the diagram of a variant of the invention of the sonar of FIG. 3.

In a variant of the invention represented in FIG. 4, the fact is used that the filtering of a signal is shown by the elimination of spectral lines corresponding to the cut band. Thus, a spectral analysis is carried out on each path and values $f_{max}$ and $f_{min}$ are converted into numbers of spectral lines that surround the part of the spectrum to be eliminated.

Paths $B_i$ and the digital signal that indicates them are obtained as previously described.

Thereafter a change of frequency of each path signal is carried out by pulsation in a multiplier 50 with a local frequency OL. This technique lowers by lowering the carrier frequency, the sampling frequency $F_{ech}$ necessary and thus diminishes the number of special analysis points that will be carried out according to the technique known as FFT. After analog-digital conversion in a converter 51 at rate $F_{ech}$, the path signals are stocked in a memory 52 so as to be successively treated by spectral analysis, path after path. The spectral analysis is carried out in a FFT analyser 53 over a period equal or close to pulse duration T.

Calculation circuits 5 are identical to those of FIG. 3, except that at the output of comparator 474, the two values of $P_1$ and $P_2$ are multiplied by K and added to $f_0$ in order to obtain the values of $f_{min}$ and $f_{max}$.

Figure 5:
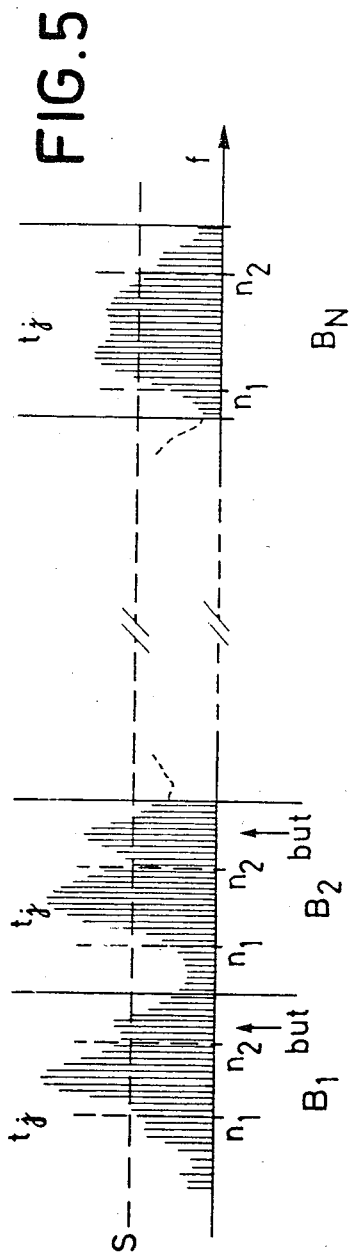
FIG. 5 the graph of the spectrum of path signals, obtained at the output of device 53 of FIG. 4.

Spectrum analyser 53 supplies sequentially provides instantaneous spectrums of all the paths $B_1$ to $B_N$ as diagramatically represented in FIG. 5. The analysis band corresponds to the maximum Doppler shifts of the goals that are estimated a priori.

Circuits 45 supply values $f_{min}$ and $f_{max}$. These values allow one to obtain, by reading in a table contained in a memory 55, the numbers $n_1$ and $n_2$ of the extreme spectral lines between which the lines must not be taken into account. These numbers n, and $n_2$ are supplied to detection devices 4 that detects if the remaining spectral lines exceed a certain threshold.

Thus, as represented in FIG. 5, the spectral lines between $n_1$ and $n_2$ are eliminated, thereby removing a false detection since these lines exceed the threshold S. On the contrary, a target is indeed in paths $B_1$ and $B_2$ but not in path $B_N$.

In a more elaborate embodiment, the level of all the spectral lines is taken into account.

Given a diffusion direction $\theta$,S with respect to the direction of carrier XX', frequency $f_i$ of the reverberated signal received by the carrier is $f_i = f_0 + K \cos\theta \cos S$. Corresponding to this frequency is a spectral level $N_i$ that can be calculated for each path as a function of the following parameters:

instant $t_j$, or distance r, trim $\alpha$, depth H, distance to the sea-bed Z.

To do this, consideration must be taken of the attenuations due to the functions of directivity in bearing and in elevation, at the emission and reception, of the track $V_i$ involved.

To each value of $(\theta,S)$ corresponds a spectral level $N_i$ and the spectrum is obtained by calculating the levels $N_i$ for the whole of the directions. $\theta$,S correspond to the reverberating zone, i.e. such that $0 \leq \theta < 2\pi$ and $S_r - \delta S/2 \leq S \leq S_R + \delta S/2$.

Surfaces 12 and 13 are decomposed into elementary parts in order to supply the calculation pace in $\theta$ and S. Between the spectrums taken at different instants, the attenuation corresponding to distance r is introduced.

Figure 6:
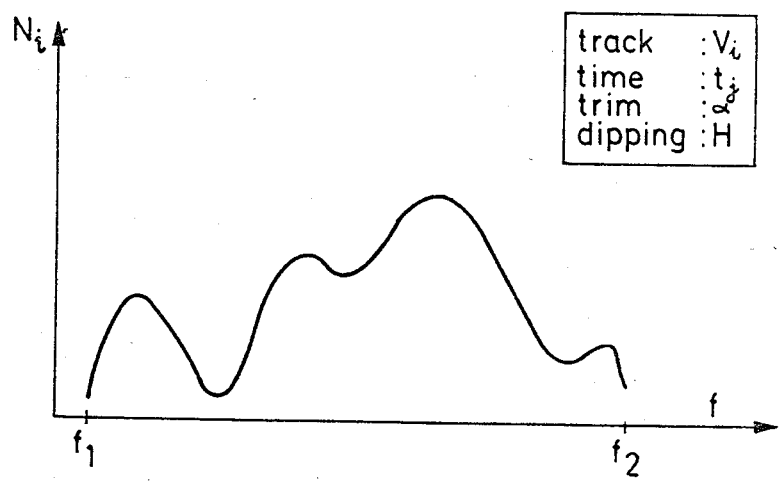
FIG. 6 the envelope of the spectrum of a path signal.

A collection of spectra is obtained such as, for example, that whose envelope is indicated in FIG. 6. The extreme frequencies for a speed v of the carrier are $f_i = f_0 - K$ and $f_2 = f_0 + K$.

Figure 7:
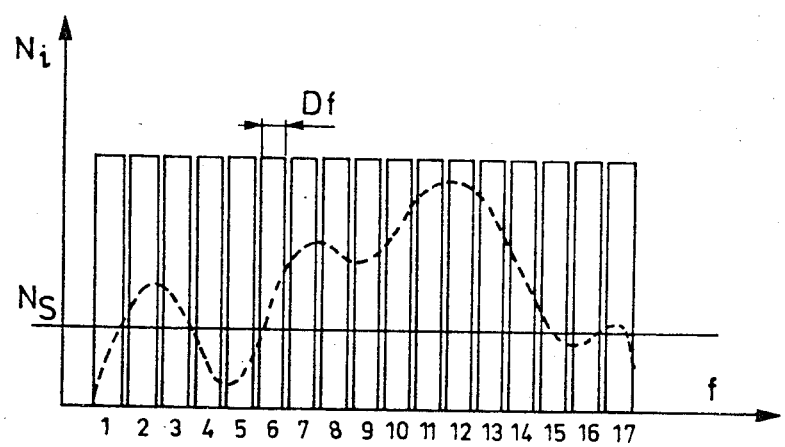
FIG. 7 the action of a comb filter on the signal of FIG. 6.

The intensity of the reverberation signal is proportional to $\int_{f_1}^{f_2} N_i df$. By rejecting indiscriminately all the band of $f_1$ to $f_2$ there are risks of masking the target if this target corresponds to a weak Doppler effect. According to the invention, is thus established in the form of a spectrum that does not take into account the levels above a given value $N_S$. For this, a battery of numbered connected pass-band filters is considered having a constant width Df, as represented in FIG. 7, and the numbers of the filters in which the level is below $N_S$ are determined, for example filters 1, 4, 5, 16. This operation is carried out for all the collection of spectra, calculated as indicated herein-above. For each path $V_i$, a series of numbers of filters is thus disposed in function of v, H, Z, α and t.

Spectral analysis FFT used in the variant of the first embodiment, is equivalent at each instant to the action of a battery of associated pass-band filters having a constant width Df substantially equal to the inverse of the duration of the analyzed signal.

The diagram of this second embodiment is that of FIG. 4 except that calculator 45 and circuit 55 are replaced by an addressable memory containing a value table. This table contains numbers of spectral lines to be eliminated, that are previously determined by calculation of each line and for different values of measurement parameters v, H, Z, α and $t_j$, and from the directivity functions involved between 0 and $2\pi$ for bearing $\theta$ and between $-\pi/2$ and $\pi/2$ for elevation S.

According to the number of path $S_i$ and the values of the measurement parameters, the table is addressed in order to run out the lines to be eliminated in the spectra that are supplied to detection device 54.

A simplified variant of the invention, described in connection with the first embodiment, consists in not taking into account elevation angle S by making cos $S=1$.

This condition supposes that angle S, between the diffusers involved and the direction of the carrier, remains small as to the absolute value, and with respect to the bearing angle since the sine only varies rapidly for stable angle values.

In order to meet this condition, it is necessary:
that the elevation angle of each path is small;
that the angular width in elevation of each path is small;
that the reverberating volume is strictly limited to the principal directivity lobe of each path;
that the elevation angle of the carrier does not vary.

Practically, these conditions are more or less satisfied when the filtering device is applied to a hull sonar of a surface or submarine ship.

In these conditions, the central frequency in direction $\theta_i$, and band $w_f$ corresponding to the angular width $\delta\theta_i$, are given by:

$$f = f_0 + K \cos \theta_i \qquad (8)$$

$$\delta f = 2K \sin(\delta\theta_i/2) \sin \theta_i \qquad (9)$$

Figure 8:
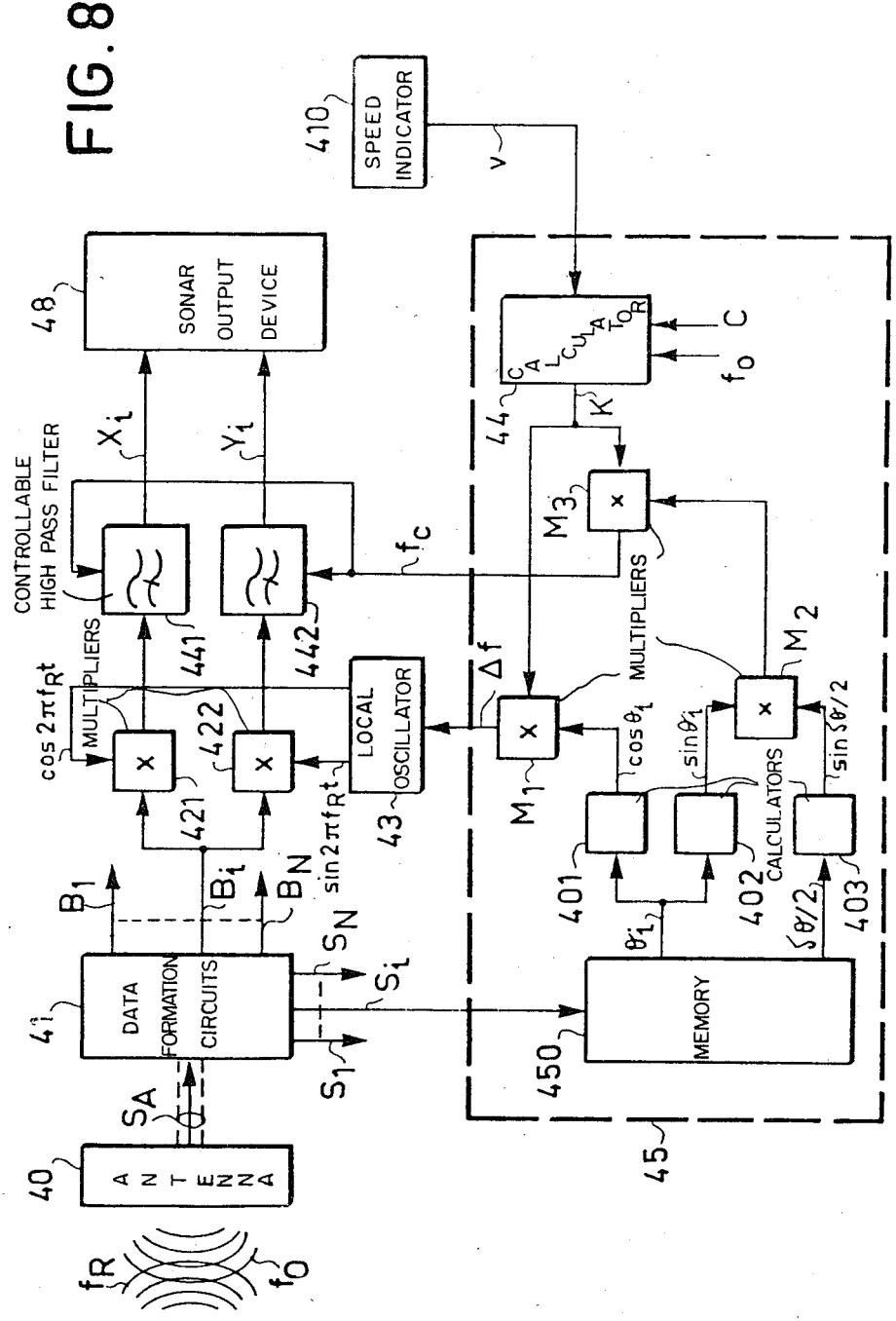
FIG. 8 diagram of a simplified sonar according to FIG. 3.

The diagram of this variant, represented in FIG. 8, is similar to that of FIG. 3 in which calculation circuits 45 have been simplified.

This signal $S_i$ supplies the addresses of values of $\theta_i$ and $\delta\theta_i/2$ in a memory 450. The value of speed v is supplied by a measurement device 410 and applied to a calculator circuit 44, that receives, furthermore, the emitted frequency value $f_0$ and the speed c of acoustic waves in water. Circuit 44 supplies at its output the value of K, according to relation (2).

The values of $\theta_i$ and $\delta\theta_i/2$ read from memory 450 are applied to calculation circuits 401, 402 and 403, that give at their outputs, respectively, the values cos $\theta_i$, sin $\theta_i$ and sin ($\delta\theta_i/2$). A multiplier circuit $M_i$, receiving the values of cos $\theta_i$ and of K, supplies the values $\Delta f$ applied to a controllable oscillator 43. A second multiplier circuit, receiving the values of sin $\theta_i$ and sin $\delta\theta_i/2$, supplies the product of these two values. This product is applied to a third multiplier circuit $M_3$ that receives the value of K and supplies the value $f_c = \delta f/2$ according to relation (9). This value $f_c$ is applied to the controllable high-pass filters 441 and 442 fixing the cutout value at value $f_c$. It is these filters that receive the signals demodulated by multipliers 421 and 422 and filtered signals $X_i$ and $Y_i$ called complex components are applied to sonar exploitation device 48.

Assembly 45 can be a digital calculator of the microprocessor type.

Figure 9:
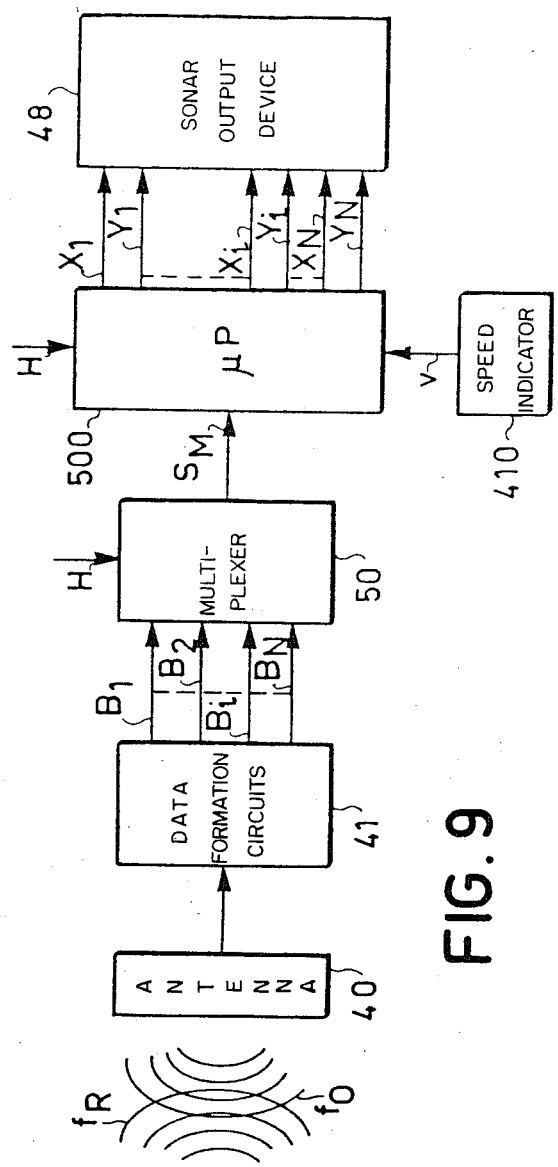
FIG. 9 diagram of an embodiment of a sonar and its adaptable filtering device using a microprocessor.

FIG. 9 shows an embodiment of a filtering device comprising a microprocessor 500. For this embodiment, N path signals $B_1, B_2, \ldots B_i \ldots B_N$ are applied to a multiplexer 50, that supplies the multiplexed and numerized signal $S_M$ at the rhythm of a clock signal H. Multiplexed signal $S_M$ is treated by microprocessor 500, that also receives the clock signal H and the speed signal v of the carrier. From this value v, the microprocessor calculates for each path the central frequency $f_R$ and cut-off frequency $f_c$. The microprocessor sorts the samples of signal $S_M$ then executes the synchronized demodulation and filtering by a digital filtering program.

Furthermore, microprocessor 500 supplies the complex components of paths such as $X_i$ and $Y_i$ applied to the sonar output device.

Such an utilization of a calculator in order to carry out the different filtering functions of the sonar can be applied to other embodiments and their variants.

We claim:
1. A method for filtering sonar signals to eliminate reverberation signals caused by the sea bottom, the sea surface, and the speed and trim of the sonar carrier, said sonar carrier having (a) an antenna which transmits and receives sonar signals, (b) a speed detector, (c) a trim detector, (d) a depth detector, (e) a distance-to-sea bottom detector, and (f) a sonar output device, comprising the steps of:
forming paths corresponding to distinct directions of sonar signals received by said antenna, each path having a path signal $B_i$;
controllably filtering the path signals to substantially eliminate reverberation signals caused by said sea bottom, said sea surface, and the speed and trim of said sonar carrier, and providing a filtered signal to said sonar ouput device;
controlling said filtering step by: (a) receiving a speed signal v, a trim signal α, a depth signal H, and a distance-to-sea bottom signal Z from said detectors, (b) calculating for each path a central Doppler-shift frequency $\Delta f_1$ and a cut-off frequency $f_{ci}$, and (c) supplying $\Delta f_1$ and $f_{ci}$ to said filtering step.

2. A method according to claim 1 wherein each path has an azimuth angle $\theta_i$ and an azimuth angular width $\delta\theta_i$ for said corresponding direction, the sonar signal transmitted on said corresponding direction has a transmission frequency $f_o$, and a filtering band $\delta f_i$ is provided to said filtering step from said controlling step such that $\delta f_i = 2f_{ci}$, and wherein said controlling step includes:
determining said angle $\theta_i$ and said angular width $\delta\theta_i$ for said corresponding direction; and
calculating said frequency $\Delta f_1$ and said frequency band $\delta f_i$ as follows:

$$\Delta f_i = K \cos \theta_i$$

-continued $$\delta f_i = 2K \left( \frac{\sin \delta\theta_i}{2} \right) \sin \theta_i$$

where: $K = 2f_o v/c$
where: c is the speed of sound in water.

3. A method according to claim 1 wherein each path has an azimuth angle $\theta_i$ and an azimuth angular width $\delta\theta_i$ for said corresponding direction, the sonar signal transmitted on said corresponding direction is transmitted in the form of at least one pulse having a frequency $f_o$, a duration T, and is transmitted at time $t_o$, the sonar signal received which corresponds to the transmitted signal is received at time t, and wherein a filtering band $\delta f_i$ is provided to said filtering step from said controlling step such that $\delta f_i = 2f_{ci}$, and wherein said controlling step includes:

determining, for said sonar signals transmitted and received on said corresponding direction, the angle $\theta_i$, the angular width $\delta\theta_i$, the frequency $f_o$, the duration T, and times $t_o$ and t;

calculating said frequency $\Delta f_1$ and said frequency band $\delta f_i$ as follows:
$\Delta f_i = K/2(P_1 + P_2)$
where: $K = 2f_o v/c$
$P_1 = \cos(8\theta_i + \delta\theta_i/2) \cos(S_R - \alpha + \delta S/2)$; and
$P_2 = \cos(\theta_i 31 \delta\theta_i/2) \cos(S_R - \alpha - \delta S/2)$.
where:
c is the velocity of sound in water;
$S_R$ = one of arc sin H/2 and arc sin Z/2; and
$\delta S = \tan S_R \times ct/2r$
where:
$r = t - t_o/2 -$
$\delta f_i = K(P_1 - P_2)$; and selecting a value for Sr which provides the best filtering of said received sonar signal.

4. A method according to claim 1 wherein said filtering step includes:

demodulating said path signal $B_i$ synchronously and in quadrature with said central Doppler-shift frequency $\Delta f_i$; and filtering the demodulated signals with $f_{ci}$.

5. A method according to claim 1 wherein a filtering band $\delta f_i$ is provided to said filtering step such that $\delta f_i = 2F_{ci}$, and wherein $\delta f_i$ is defined by $f_{mini}$ and $f_{maxi}$, and wherein said filtering step includes computing the Fourier transform of said path signals $B_i$ and $f_{mini}, f_{maxi}$.

6. Apparatus for filtering sonar signals to eliminate reverberation signals caused by the sea bottom, the sea surface, and the speed and trim of the sonar carrier, said sonar carrier having (a) an antenna which transmits and receives sonar signals, (b) a speed detector, (c) a trim detector, (d) a depth detector, (e) a distance-to-sea bottom detector, and (f) sonar output device, comprising:

means for forming paths corresponding to distinct directions of sonar signals received by said antenna, each path having a path signal $B_i$;

means for controllably filtering the path signals to substantially eliminate reverberation signals caused by said sea bottom, said sea surface, and the speed and trim of said sonar carrier, and providing a filtered signal to said sonar output device;

means for controlling said filtering step by: (a) receiving a speed signal v, a trim signal $\alpha$, a depth signal H, and a distance-to-sea bottom signal Z from said detector, (b) calculating for each path a central Doppler-shift frequency $\Delta f_1$ and a cut-off frequency $f_{ci}$, and (c) supplying $\Delta f_1$ and $f_{ci}$ to said filtering means.

7. Apparatus according to claim 6 wherein each path has an azimuth angle $\theta_i$ and an azimuth angular width $\Delta\theta_i$ for said corresponding direction, the sonar signal transmitted on said corresponding direction has a transmission frequency $f_o$, and a filtering band $\delta f_i$ is provided to said filtering means by said controlling means such that $\delta f_i = Bf_{ci}$, and wherein said controlling means include:

means for determining said angle $\theta_i$ and said angular width $\delta\theta_i$ for said corresponding direction; and means for calculating said frequency $\Delta f_i$ and said frequency band $\delta f_i$ as follows:
$\Delta f_i = K \cos \theta_i$
$\delta f_i = 2K (\sin \delta\theta_i/2) \sin \theta_i$
where:
$K = 2f_o v/c$
where:
c is the speed of sound in water.

8. Apparatus according to claim 6 wherein each path has an aximuth angle $\theta_i$ and an aximuth angular width $\delta\theta_i$ for said corresponding direction, the sonar signal transmitted on said corresponding direction is transmitted in the form of at least one pulse having a frequency $f_o$, a duration T, and is transmitted at time $t_o$, the sonar signal received which corresponds to the transmitted signal is received at time t, and wherein a filtering band $\delta f_i$ is provided to said filtering means by said controlling means such that $\delta f_i = 2f_{ci}$, and wherein said controlling means include:

means for determining, for said sonar signals transmitted and received on said corresponding direction, the angle $\theta_i$, the angular width $\delta\theta_i$, the frequency $f_o$, the duration T, and times $t_o$ and t;

means for calculating said frequency $\Delta f_i$ and said frequency band $\delta f_i$ as follows:
$\Delta f_i = K/2 (P_1 + P_2)$
Where: $K = 2f_o v/c$
$P1 = \cos(\theta_i + \delta\theta_i/2) \cos(S_R - \alpha + \delta S/2)$; and
$P2 = \cos(\theta_i - \delta\theta_i/2) \cos(S_R - \alpha - \delta S/2)$
where: c is the velocity of sound in water;
Sr = one of arc sin H/2 and arc sin Z/2; and
$\delta S = \tan S_R \times cT/2r$
where: $r = t - t_o/2$
$\delta f_i = K (P_1 + p_2)$; and means for selecting a value for $S_r$ which provides the best filtering of said received sonar signal.

9. Apparatus according claim 6 wherein said filtering means includes:

means for demodulating said path signal $B_i$ synchronously and in quadrature with said central Doppler-shift frequency $\Delta f_i$; and means for filtering the demodulated signal with $f_{ci}$.

10. Apparatus according to claim 6 wherein said controlling means provides a frequencing band $\delta f_i$ to said filtering means such that $\delta f_i = 2f_{ci}$, and where $\delta f_i$ is defined by $f_{mini}$ and $f_{maxi}$, and wherein said filtering means includes means for computing the Fourier transform of said path signals $B_i$ and $f_{mini}, f_{maxi}$.

11. Apparatus according to claim 8 wherein said band $\delta f_i$ is defined by $f_{mini}$ and $f_{maxi}$, and wherein said calculating means including means for calculating $f_{mini}$ and $f_{maxi}$ as follows:
$f_{mini} = f_o + KP_1$
$f_{maxi} = f_o + KP_2$,
and wherein said filtering means includes:

means for providing spectral lines which represent the Fourier transform of said path signals $B_i$;

means for converting $f_{mini}$ and $f_{maxi}$, into spectral lines; and means for eliminating from the spectral lines corresponding to $B_i$, those spectral lines which are on and between the spectral lines corresponding to $f_{mini}$ and $f_{maxi}$.

12. Apparatus according to claim 6 wherein said means for forming paths provides a signal $S_i$ to said controlling means for each said path, and wherein said controlling means includes memory means for storing a plurality of spectral lines corresponding to frequencies to be eliminated for each said path and for values of v, H, Z, and $\alpha$, said memory means being addressed by said signal $S_i$, and wherein said filtering means includes:

means for calculating the Fourier transform of said path signal $B_i$ and providing a plurality of spectral lines corresponding thereto; and means for eliminating from said plurality of spectral lines those spectral lines stored in said memory means and addressed by said signal $S_i$.

13. Apparatus according to claim 12 further including multiplexing means receiving said path signals $B_i$ from said means for forming paths, and wherein said filtering means and said controlling means are formed in a microprocessor coupled between said multiplexing means and said sonar output device.

* * * * *